(12) United States Patent
Truche et al.

(10) Patent No.: US 7,262,841 B2
(45) Date of Patent: Aug. 28, 2007

(54) LASER ALIGNMENT FOR ION SOURCE

(75) Inventors: Jean-Luc Truche, Los Altos, CA (US); Antonius A. van de Goor, Foster City, CA (US); Steven Mark Hoppe, Jr., Santa Clara, CA (US); Frederick Robert Ley, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 169 days.

(21) Appl. No.: 11/083,236

(22) Filed: Mar. 17, 2005

(65) Prior Publication Data

US 2006/0207115 A1    Sep. 21, 2006

(51) Int. Cl.
    *G01B 11/26*    (2006.01)
(52) U.S. Cl. ............................................... 356/153
(58) Field of Classification Search ............... 356/153
    See application file for complete search history.

(56) References Cited

U.S. PATENT DOCUMENTS

| | | | | |
|---|---|---|---|---|
| 5,351,404 A | * | 10/1994 | Smith | ........................ 30/366 |
| 5,864,137 A | * | 1/1999 | Becker et al. | ............... 250/287 |
| 6,175,112 B1 | * | 1/2001 | Karger et al. | ................ 250/288 |
| 6,707,039 B1 | * | 3/2004 | Truche et al. | ................ 250/288 |
| 6,952,011 B2 | * | 10/2005 | Brown et al. | ................ 250/288 |
| 6,956,208 B2 | * | 10/2005 | Reilly et al. | ................. 250/288 |
| 2003/0160167 A1 | | 8/2003 | Truche et al. | |
| 2003/0233098 A1 | * | 12/2003 | Markworth | ................... 606/96 |
| 2004/0021071 A1 | * | 2/2004 | Mordekhay | .................. 250/288 |
| 2005/0045815 A1 | * | 3/2005 | Bui | ............................. 250/282 |

* cited by examiner

*Primary Examiner*—Tarifur Chowdhury
*Assistant Examiner*—Isiaka O Akanbi

(57) ABSTRACT

An apparatus and method for aligning a laser beam in an ion source. A mounting member has a first end, a second end, and an axis. An awl is positioned on the axis and operably connected to the first end. A biasing member is arranged to urge the awl along the axis when the apparatus is mounted on the ion source to create a mark for aligning the laser beam.

18 Claims, 6 Drawing Sheets

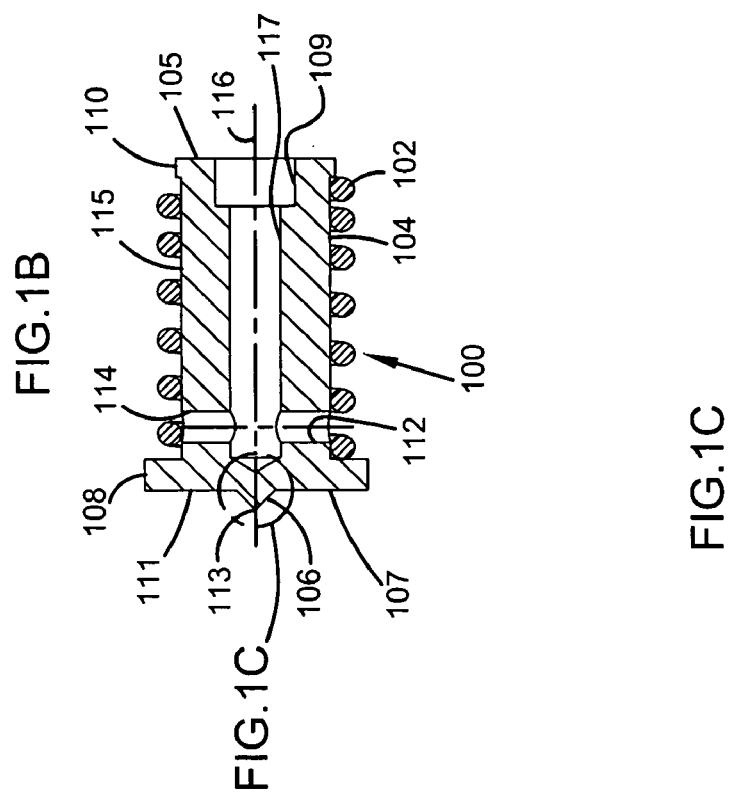
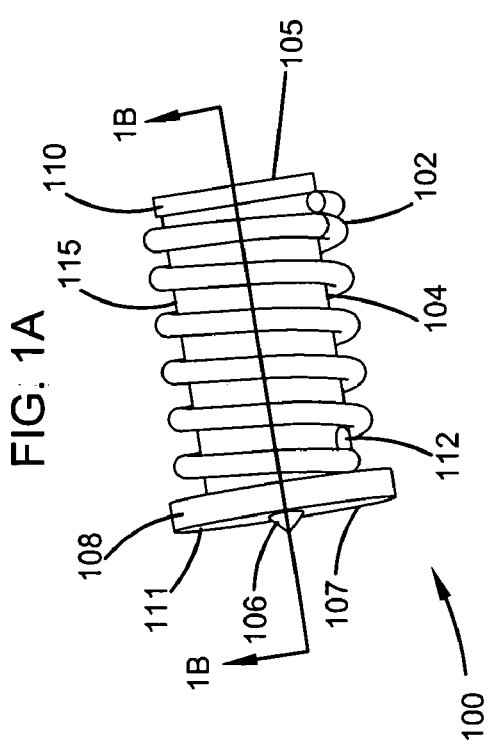

LASER ALIGNMENT FOR ION SOURCE

BACKGROUND

When analyzing samples with an analytical instrument, such as a mass spectrometer that has a matrix assisted laser desorption/ionization (MALDI) ion source, the samples are commonly mixed into in a UV absorbing matrix material and then deposited on a sample plate where the sample and matrix co-crystallize upon drying. A focused pulse of UV energy from a laser beam is directed at the sample, and the UV energy ionizes the sample, which is then passed from the ion source to the analytical instrument through a small orifice such as that defined by a capillary tube. For accurate analysis, the laser beam spot must impinge the plate in a location coinciding with the center axis of the orifice opening of the instrument. Any deviation (even as low as a few hundred microns) from this location of impingement is detrimental to the sensitivity of the spectrometer.

Alignment is commonly attempted using a video camera to image the laser beam spot and the proximal end of the orifice opening. Due to a parallax effect, however, it can be difficult to accurately align the laser beam spot.

SUMMARY

In general terms, the present invention relates to a laser alignment tool for forming a dimple to mark the proper location for a laser beam to strike a target in an ion source.

One aspect of the invention provides a method of aligning a laser beam for an ion source. The method comprises forming a mark on a target plate for carrying a sample, the mark being axially aligned with a orifice between an ion source and an analytical instrument; projecting a laser beam onto the target plate forming a UV absorbing matrix material mixed with a sample of molecules for analysis laser spot; and if the laser spot is not aligned with the mark, aligning the laser spot to substantially coincide with the mark.

Another aspect of the invention provides a method of aligning a laser beam for an ion source. The method comprises biasing an awl toward a matrix-assisted laser desorption/ionization (MALDI) plate, the awl being axially aligned with an orifice between an ion source and an analytical instrument; pressing the awl against a protective cover mounted on the MALDI plate; forming a mark on the protective cover, the mark opposing the orifice; projecting a laser beam onto the MALDI plate forming a laser spot; if the laser spot is not aligned with the mark, aligning the laser spot to substantially coincide with the mark; and removing the protective covering from the MALDI plate upon the laser spot substantially coinciding with the mark.

Yet another aspect of the invention provides an apparatus for aligning a laser beam in an ion source. The apparatus comprises a mounting member having a first end, a second end, and an axis. An awl is positioned on the axis and operably connected to the first end. A biasing member is arranged to urge the awl along the axis when the apparatus is mounted on the ion source.

BRIEF DESCRIPTION OF THE DRAWINGS

FIG. 1A is an axonometric projection of the laser alignment tool.

FIG. 1B is a cross-sectional view of the laser alignment tool illustrated in FIG. 1A, taken along line 1B-1B.

FIG. 1C is a partial view of an awl on the laser alignment tool illustrated in circle 1C of FIG. 1

DETAILED DESCRIPTION

Figure 2:
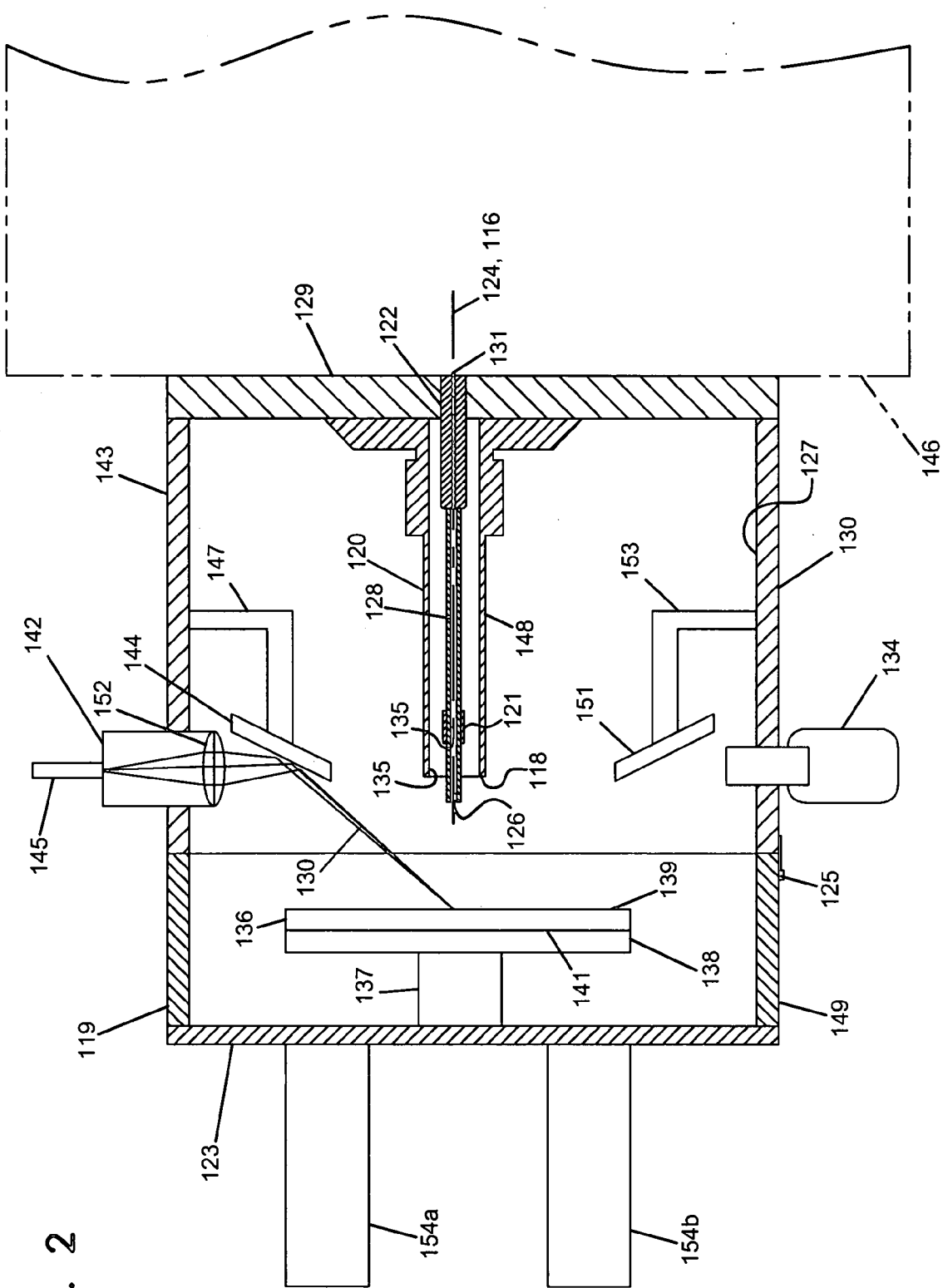
FIG. 2 is a top plan cross-sectional view of a Matrix Assisted Laser Desorption/Ionization (MALDI) ion source in which the laser alignment tool can be used, including a capillary assembly in cross-section.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring to FIGS. 1A and 1B, one possible embodiment of a laser alignment tool 100 provides a fixture for marking the location at which a laser beam should strike a target plate. The laser alignment tool 100 includes a mounting member 104 that has a generally tubular wall 103, defining a cavity 109 sized to receive a mounting structure such as a capillary extension tube as described below, and a central axis 116. A first or distal end 105 of the tubular member 104 is open to the cavity 109 for receiving the capillary extension tube into the cavity 109. A second or proximal end 107 of the tubular member 104 has a wall 111 that extends radially from and is orthogonal to the axis 116.

The shape and dimensions of this inner cavity 109 can vary depending on the shape of the capillary extension tube that it receives. Additionally, the shape and dimensions of the inner cavity 109 are established so that the capillary tube 128 will gently slide into the inner cavity 109 but the laser alignment tool 100 will not become skewed or otherwise move radially with respect to an axis of the capillary tube. At least one hole 112, 114 is defined in the tubular member 104. The holes 112, 114 extend between and open to the inner cavity 109 and the outer surface 115 of the tubular member 104 so that a cleaning solvent can flow through the cavity 109 to clean the inner surfaces 117 of the laser alignment tool 100.

An awl 106 projects from the wall at the proximal end 107 of the tubular member 104. The awl 106 has a point 113 that is positioned on the axis 116. In one possible embodiment, the awl 106 is formed with a right circular cone in which oppositely disposed segments on the conical walls that extend to the vertex are at 90° relative to one another. The awl 106 can include any structure that has a point capable of leaving a mark when pressed against a surface.

Although a certain configuration of the awl 106 is described, other embodiments include awls that have shapes other than a right circular cone or other than a cone. Other possible embodiments could also include structures to support the point of the awl on the axis other than the radial wall and other than a structure that completely closes off the cavity at the proximal end 107.

A first flange 110 is positioned at the first or distal end 105 of the tubular member 104 and extends radially from the outer surface 115. A second flange 108 is positioned at the second or proximal end 107 of the tubular member extends radially from the outer surface 115. A spring 102 extends around the outer surface 115 of the tubular member 104 and is seated between and is held in positioned by the first 110 and second 108 flanges. During manufacturing the proximal end of the spring 102 is fitted over the first flange 110 and then twisted around the first flange 110 in a screw-like manner until it is completely seated between the first and second flanges 110 and 108.

In the exemplary embodiment, the laser alignment tool 100 is formed with a material that is easily cleaned and is hard enough that the awl 106 will leave a mark when pressed against a surface. One possible example of a material that can be used to form the laser alignment tool 100 is stainless steel, which is hardened by a heat treatment process. In other possible embodiments, the awl 106 and the other portions of the laser alignment tool 100 are made from different types of material.

Referring to FIG. 2, one possible application for the laser alignment tool 100 is an atmospheric pressure matrix-assisted laser desorption/ionization (AP-MALDI) ion source 119 for instrumentation 146 such as a mass spectrometer. An example of an ion source with which the laser alignment tool can be used is the atmospheric pressure ion source identified by model no. G1974A PDF-MALDI, which is commercially available from Agilent Technologies, Inc. having its principal place of business in Palo Alto, Calif. The ion source 119 includes a housing 123 that can open to provide access to interior components. In one possible embodiment, the housing 123 has target side or portion 132 and an instrument side or portion 130. The target side 132 is slidably mounted on rails 154a and 154b that allow it to be axially slid into and out of sealing engagement with the instrument side 130 of the housing 119. A latch 125 is attached to the target 132 and instrument 130 sides of the housing 119. The latch 125 secures the housing in a closed position so that the two portions of the housing remain in a stationary position with respect to one another and so that the interior cavity 127 of the housing 119 remains closed and sealed, or isolated, from the exterior environment.

A capillary assembly 148 is mounted inside the instrument side 130 of the housing 119 and includes a capillary 122, a capillary extension 128, and a heating sleeve 120. The capillary assembly 148 has a center axis 124 defining an ion passage 133 for ions to flow from the housing 119 into the instrument 146. The capillary 122 passes through the wall 129 of the housing 119 on the instrument portion 130 and defines an orifice 131 that provides a passage for ions to flow from the interior 127 of the housing 119 into the analytical instrument 146. The capillary 122 extends into the interior volume 127 of the housing 119. The capillary extension 128 has an opening 126 providing an input to the ion passage 133 defined in the capillary assembly 148. The capillary extension 128 is axially aligned with the capillary 122 and extends outward from the capillary 122 and into the housing 119. The tubular heating sleeve 120 surrounds and is concentric to the capillary extension tube 128. An annular space 135 is defined between the capillary extension 128 and the heating sleeve 120.

Additionally, a collar 121 is positioned on the outer surface of the capillary extension 128. The cavity 109 defined in the laser alignment tool 100 conforms to the geometry of the outer surface of the capillary extension 128 and the collar 121. Although a particular structure for a capillary assembly 148 is illustrated in the exemplary embodiment, other embodiments might use different structures for defining a passage for ions to flow into the analytical instrument 146.

A target holder 138 is mounted in the interior 127 of the housing 119 and positioned on the target side 132 of the housing by xy stages 137. A target plate 136, which has a front or sample surface 139 and a rear surface 141, is mounted on the target holder 138. When mounted on the target holder 138, the target plate 136 is orthogonal to and directly opposes the opening 126 of the capillary extension 128. In the exemplary embodiment, the target plate 136 is mounted on the target holder 138 by magnetic force. In other embodiments, alternative mechanisms such as clips are used to mount the target plate 136 to the target holder 138. In the exemplary embodiment, a UV absorbing matrix material mixed with a sample of molecules for analysis is deposited on the target plate 136. Although particular structures for a target holder 138 and target plate 136 are illustrated in the exemplary embodiment, other embodiments might use different structures and configurations.

The opening 126 to the capillary extension 128 is opposing and spaced from, but proximal to, the target plate 136. When a laser beam 130, described herein, strikes the target plate 136, energy from the laser beam 130 causes the sample mixed in the matrix to ionize and form a gaseous plum at the opening 126 of the capillary extension 128. A mechanism, such as pressure differential and electrical fields then causes the ions to flow through the ion passage 133 and into the analytical instrument 146 for analysis.

A laser assembly 142 is mounted on the sidewall 143 of the instrument side 130 of the housing 119. The laser assembly 142 includes a laser 145 that orientated to project a laser beam 130 though a lens 152. In one possible embodiment, the laser 145 is positioned orthogonally to the axis 124 of the capillary assembly 148. A mirror 144 is then positioned and orientated to reflect the laser beam 130 so that it is directed toward the target plate 136 and to strike the target plate 136 at a point directly opposing the opening 126 of the capillary extension 128. The mirror 144 is mounted on a bracket 147 to support it in a desired orientation. Although a particular arrangement for the laser assembly 142 is illustrated in the exemplary embodiment, other embodiments might use different structures arrangements for the laser 145 and an associated laser assembly 142.

A video camera 134 is also mounted on a sidewall 149 of the instrument side 130 of the housing 119. A mirror 151 is mounted on a bracket 153 and is positioned and orientated to reflect and image of at least the portion of the target plate 136 that directly opposes the opening 126 of the capillary extension 128. The video camera 134 is positioned and orientated so that the reflected image of the target plate 136 in the mirror is within its field of view and an operator monitoring the output of the video camera 134 can view where the laser beam 130 strikes the target plate 136 when the housing 119 is closed and sealed. In one possible embodiment, the video camera 134 is positioned orthogonally to the axis 124 of the capillary assembly 148, and video camera 134 and the laser assembly 142 are mounted on opposing sidewalls 143 and 149. Although a particular arrangement and orientation for the video camera 134 is illustrated in the exemplary embodiment, other embodiments might use different arrangements and orientations for the video camera 134 or even different mechanism for viewing the target plate 136 while the laser 145 is projecting a laser beam 130.

Figure 3:
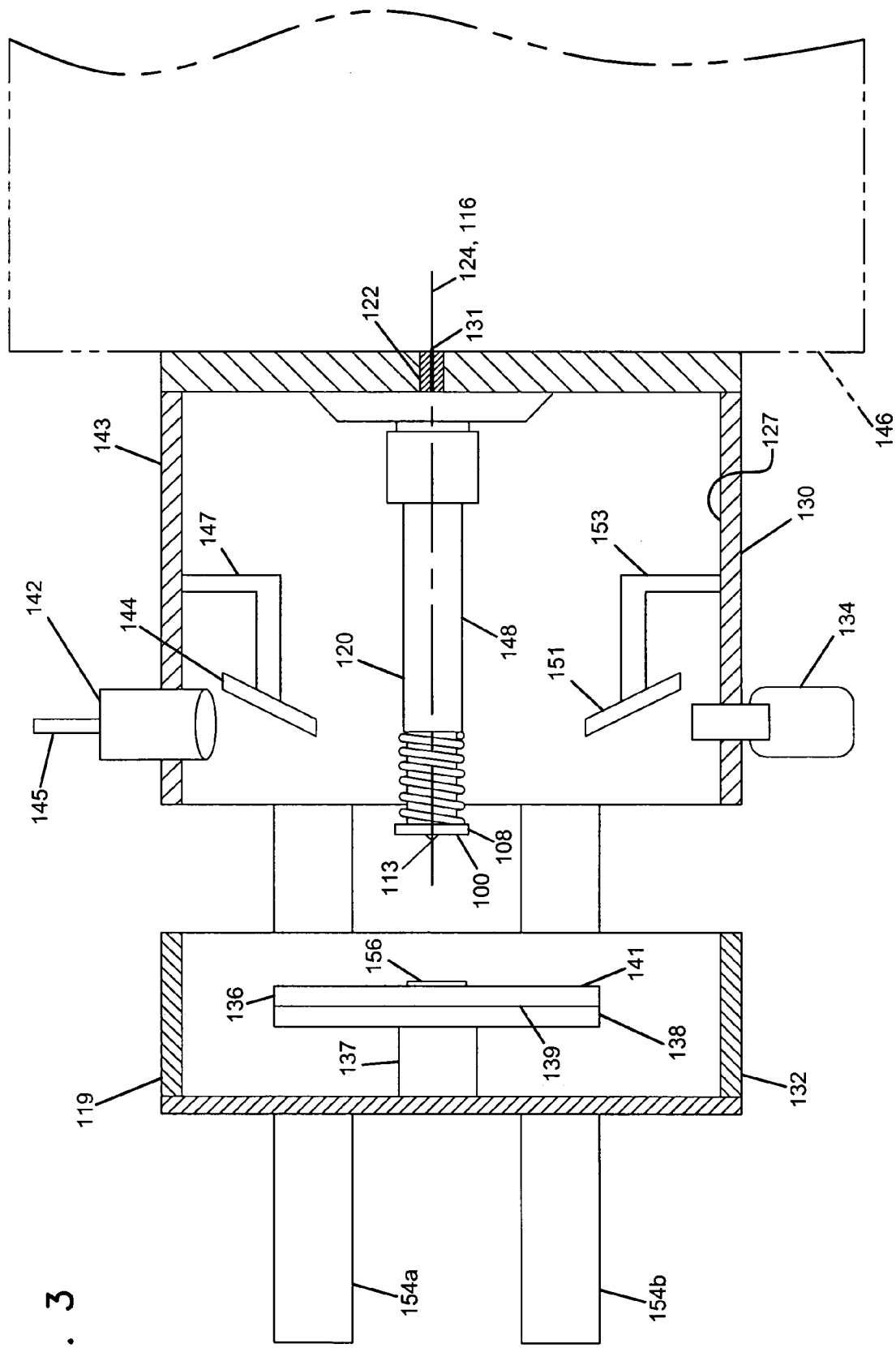
FIG. 3 is a top plan cross-sectional view of the MALDI ion source illustrated in FIG. 2, including the mounted laser alignment tool illustrated in FIGS. 1A and 1B, with the housing in an open position, including a top plan view of a capillary assembly.
Figure 6:
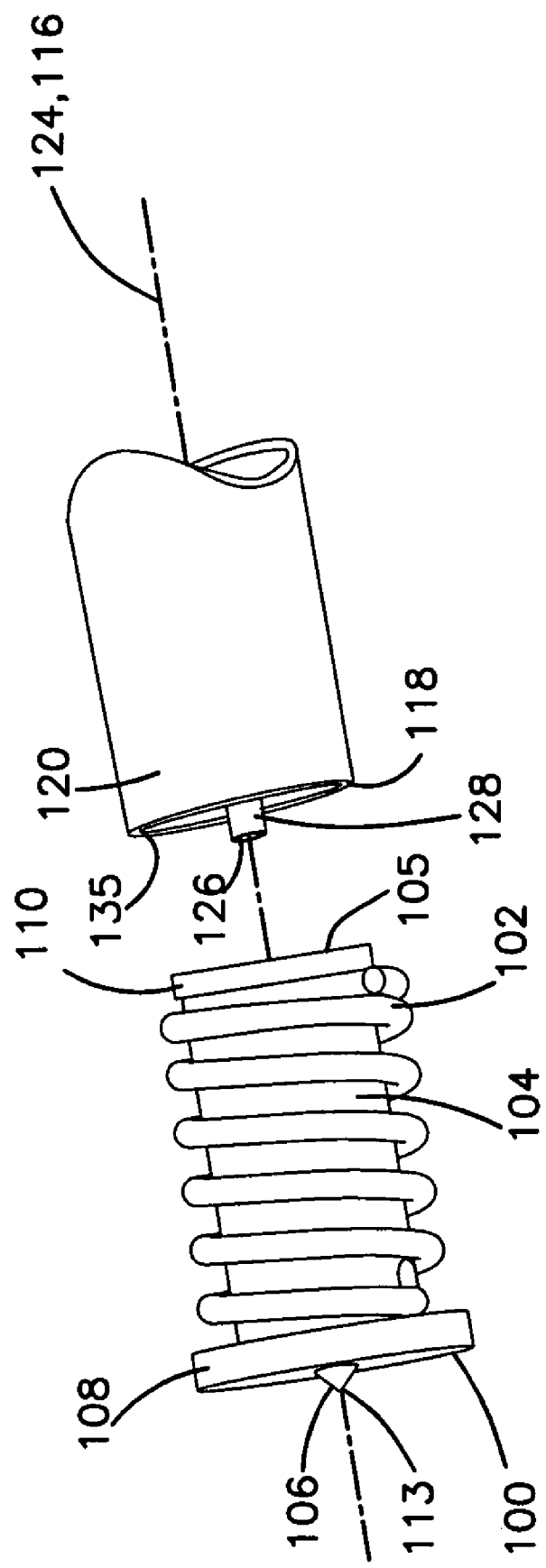
FIG. 6 is an axonometric projection of the laser alignment tool being inserted into a heating sleeve (and over the end of a capillary extension).

In use, referring to FIGS. 3 and 6, the housing 119 is opened by separating the target side 132 from the instrument side 130. The distal end 105 of the laser alignment tool 100 is then inserted into the annular space 135 between the capillary extension 128 and the heating sleeve 120 so that the spring 102 is seated against the face 118 of the heating sleeve 120. In this position, the point 113 of the awl 106 is aligned on the axis 124 of the capillary assembly 148.

Figure 5B:
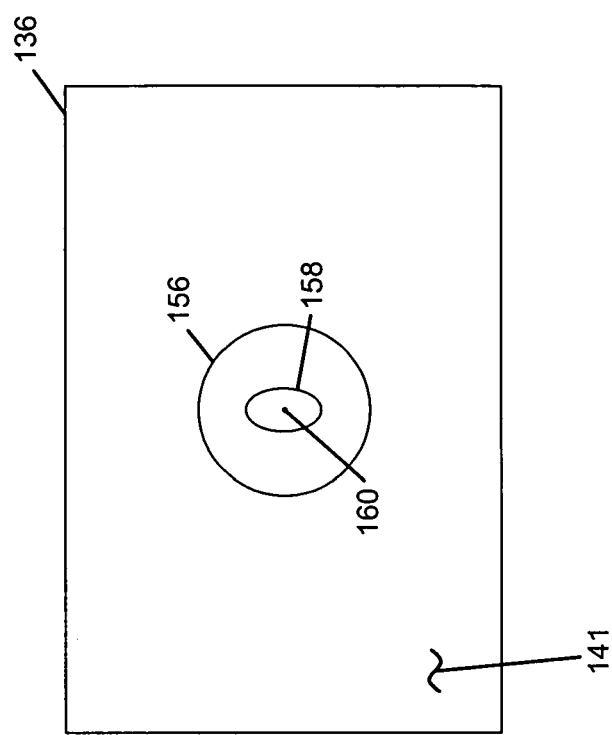
FIG. 5B is a target plate with a mark on the protective covering and a laser beam spot.
Figure 5A:
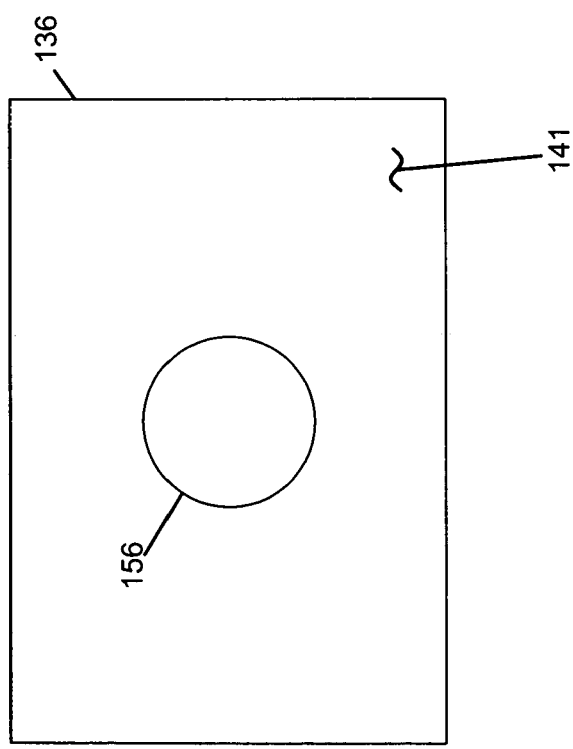
FIG. 5A is a target plate with a protective covering attached.

Referring to FIGS. 3 and 5a an adhesive paper label 156 is placed on the back surface of the target plate 136, and the target plate 136 is mounted on the target holder 138 so that the front or sample surface 139 is facing the target holder 138. The paper 156 has UV fluorescence, which provides visibility of the laser beam spot. In an embodiment, the adhesive paper label 156 also has a yellow color.

Figure 4:
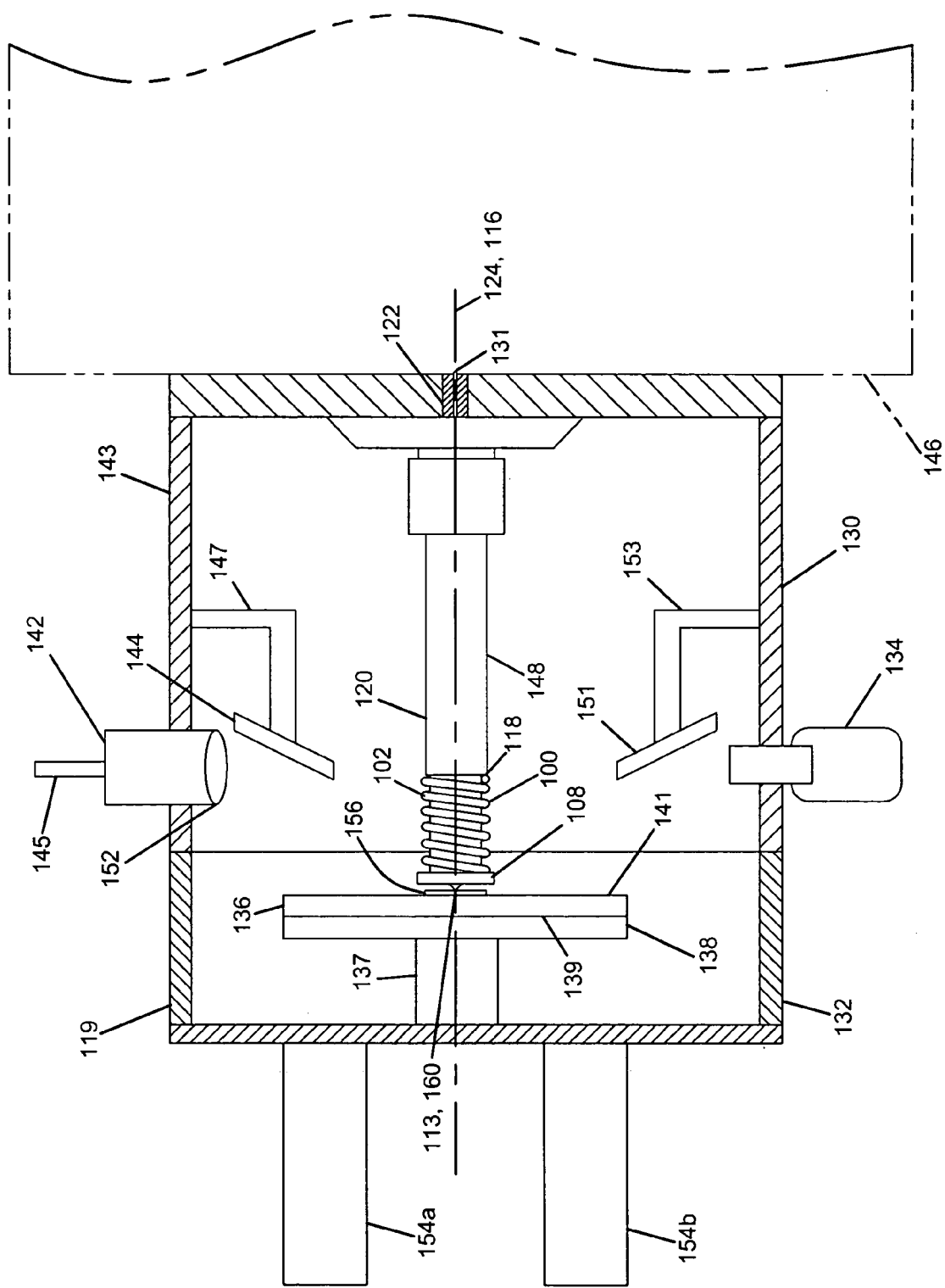
FIG. 4 is a top plan cross-sectional view of a MALDI Source as illustrated in FIG. 2, including the mounted laser alignment tool, with the housing in a closed position, including a top plan view of a capillary assembly.

Referring to FIGS. 4 and 5b after the laser alignment tool 100 and target plate 136 with the adhesive paper label 156 are mounted, the housing 119 is closed so that the target side 132 of the housing engages the instrument side 130 of the housing 119. The point 113 of the awl 106 strikes the paper label 156 and leaves a mark or dimple 160 in the paper 156. Additionally, the spring 102 is compressed between the flange 108 at the proximal end 107 of the laser alignment tool 100 and the face 118 of the heating sleeve 120. The spring 102 biases or urges the awl 106 against the paper label 156 and the spring force helps make a visible mark 160 in the adhesive paper label 156.

Other embodiments for forming a mark 160 to align the laser 130 are possible. For example, a mark could be placed directly into the surface 141 of the target plate 136. In other embodiments, different types of protective coatings other than the label 156 described herein could be used for receiving a dimple 160 by the awl 106. In yet other embodiment, the mark 160 could be placed on a substitute or dummy target plate or even on the sample surface 139 of the target plate 136 as opposed to the back surface 141. There are also other possible embodiments for mounting the laser alignment tool 100 in addition to the exemplary embodiment disclosed herein. For example, one embodiment might be configured to fit over the end of the heating sleeve 120.

After forming the dimple 160 in the adhesive paper label 156 and opening the housing 119, the laser alignment tool 100 is removed from the capillary assembly 148, and the housing is closed again. The laser 142 is then activated to project a laser beam spot 158 onto the target plate 136. The position of the laser beam spot 158 is adjusted so that it is centered on the dimple 160. In one possible embodiment, the position of the laser beam spot 158 is adjusted by laterally adjusting the position of the laser 145 relative to the sidewall 143 of the housing 119. In another possible embodiment the position of the laser beam spot 158 is adjusted by changing the angular orientation of the laser 130 with respect to the sidewall 143 of the housing 119. In other possible embodiment the position of the laser beam spot 158 is adjusted by moving the position and orientation of the mirror 144 or by some other mechanism. The laser beam spot 158 is viewed through the video camera 134 while it is being positioned.

After the laser 130 is aligned, the housing 119 is opened, the target plate 136 is removed form the target holder 138, and the adhesive paper label 156 is removed from the target plate 136. The target plate 136 could be washed with isopropyl alcohol or some other cleaning solvent to remove any residual adhesive. A sample can then be deposited onto the target plate 136 for testing and analysis.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method of aligning a laser beam for an ion source having an opening, the method comprising:
    forming a mark on a target plate, the mark being substantially axially aligned with the orifice of the ion source simultaneously with formation of the mark;
    projecting a laser beam onto the target plate forming a laser spot; and
    if the laser spot is not aligned with the mark, aligning the laser spot to substantially coincide with the mark.

2. The method of claim 1 wherein forming a mark on a target plate includes pressing an awl against the target plate.

3. The method of claim 2 wherein pressing an awl against the target plate includes biasing the awl toward the target plate with a biasing member.

4. The method of claim 3 wherein biasing the awl toward the target plate with a biasing member include biasing the awl with a spring.

5. A method of aligning a laser beam for an ion source having an opening, the method comprising:
    forming a mark on a target plate, the mark being substantially axially aligned with the orifice of the ion source wherein forming a mark on a target plate includes marking a protective covering mounted on the target plate;
    projecting a laser beam onto the target plate forming a laser spot; and
    if the laser spot is not aligned with the mark, aligning the laser spot to substantially coincide with the mark.

6. The method of claim 5 wherein marking a protective covering mounted on the target plate includes marking an adhesive label mounted on the target plate.

7. The method of claim 5 further comprising removing the protective covering from the target plate upon the laser spot substantially coinciding with the mark.

8. The method of claim 1 wherein forming a mark on a target plate for carrying a sample includes forming a mark on a matrix-assisted laser desorption/ionization (MALDI) plate.

9. The method of claim 1 further comprising biasing awl toward the target plate.

10. A method of aligning a laser beam for an ion source having an opening, the method comprising:
    biasing an awl toward a matrix-assisted laser desorption/ionization (MALDI) plate, the awl being substantially axially aligned with the orifice of the ion source;
    pressing the awl against a protective cover mounted on the MALDI plate;
    forming a mark on the protective cover, the mark opposing the orifice;
    projecting a laser beam onto the MALDI plate forming a laser spot;
    if the laser spot is not aligned with the mark, aligning the laser spot to substantially coincide with the mark; and removing the protective covering from the MALDI plate upon the laser spot substantially coinciding with the mark.

11. An apparatus for aligning a laser beam in an ion source, the apparatus comprising:
a mounting member having a first end, a second end, and an axis;
an awl positioned on the axis and operably connected to the first end; and
a biasing member arranged to urge the awl along the axis when the apparatus is mounted on the ion source.

12. The apparatus of claim 11 further comprising:
first and second flanges positioned proximal to the first and second end, respectively; and
the biasing member is formed with a spring positioned between the first and second flanges.

13. The apparatus of claim 12 wherein the mounting member is a tubular sleeve.

14. The apparatus of claim 13 wherein the spring is concentric with the tubular sleeve.

15. The apparatus of claim 12 further comprising an ion source, the ion source having a capillary assembly forming an orifice, wherein the mounting member is removably mounted on the capillary assembly, the awl is axially aligned with the orifice, and the spring is compressed between the first flange and the capillary assembly.

16. The apparatus of claim 15 wherein:
the capillary assembly includes a capillary extension tube and a heating sleeve concentric to the capillary extension tube;
the mounting member is a tubular sleeve concentric to and at least partially and removably inserted between the capillary extension tube and the heating sleeve; and
the spring is compressed between the first flange and the heating sleeve.

17. The apparatus of claim 15 further comprising an ion matrix-assisted laser desorption/ionization (MALDI) plate and wherein the spring urges the awl against the MALDI plate.

18. The apparatus of claim 15 further comprising an analytical instrument, the analytical instrument defining an orifice, the orifice of the analytical instrument in communication with the orifice of the capillary assembly.

* * * * *